US012783224B2

(12) United States Patent
Biswas et al.

(10) Patent No.: US 12,783,224 B2
(45) Date of Patent: Nov. 3, 2026

(54) APPLICATION DISPOSITION DEFINITION AGENT TO UPDATE APPLICATIONS WITHOUT ACCESS TO SOURCE CODE

(71) Applicant: INTERNATIONAL BUSINESS MACHINES CORPORATION, Armonk, NY (US)

(72) Inventors: Pijush Kanti Biswas, New Delhi (IN); Abhishek Kumar Gautam, New Delhi (IN); Kailash Chandra Verma, Gurugram (IN)

(73) Assignee: International Business Machines Corporation, Armonk, NY (US)

( * ) Notice: Subject to any disclaimer, the term of this patent is extended or adjusted under 35 U.S.C. 154(b) by 248 days.

(21) Appl. No.: 18/053,743

(22) Filed: Nov. 8, 2022

(65) Prior Publication Data

US 2024/0152346 A1 May 9, 2024

(51) Int. Cl.
*G06F 8/65* (2018.01)

(52) U.S. Cl.
CPC .................................... *G06F 8/65* (2013.01)

(58) Field of Classification Search
CPC .................................... G06F 8/65; G06F 8/76
See application file for complete search history.

(56) References Cited

U.S. PATENT DOCUMENTS

2008/0300851 A1* 12/2008 Chakrabarti ............ G06F 8/433 703/22
2011/0035755 A1* 2/2011 Huang .................. G06F 9/4856 718/106
2015/0178263 A1* 6/2015 Meschkat ............. G06F 40/117 715/234
2016/0378450 A1* 12/2016 Fu ............................ G06F 8/60 717/177
2018/0357055 A1 12/2018 Apte et al.
(Continued)

OTHER PUBLICATIONS

Fuentes-Fernández, R. et al., "A Model-Driven Process for the Modernization of Component-Based Systems"; Science Direct (2012), vol. 77, pp. 247-269.

(Continued)

*Primary Examiner* — Phillip H Nguyen
(74) *Attorney, Agent, or Firm* — CHIP LAW GROUP

(57) ABSTRACT

An application disposition definition agent (ADDA) system intercepts runtime data generated by resources of a first platform when an application is executing in the first platform. The ADDA system discovers components of the application based on the intercepted runtime data. The ADDA system generates an application architecture that includes the discovered components of the application. The ADDA system identifies transactional behaviors of the components based on the intercepted runtime data. The ADDA system determines scalability and performance parameters of each discovered component based on the intercepted runtime data. The ADDA system generates an application architecture that includes the discovered components of the application, the transactional behaviors of the components, and the scalability and performance parameters of the components. The generated application architecture can be used to deploy the application in a second platform.

18 Claims, 8 Drawing Sheets

(56) References Cited

U.S. PATENT DOCUMENTS

| | | | | |
|---|---|---|---|---|
| 2019/0205106 A1* | 7/2019 | Sharma | .................. | G06F 8/427 |
| 2020/0089515 A1* | 3/2020 | Hari | ......................... | G06N 3/02 |

OTHER PUBLICATIONS

Biener, A. et al, "How to use IBM continuous modernization with Google Cloud"; (Date: Unknown); 24 pgs.
Amra, N. K. et al., "Modernizing IBM i Applications from the Database up to the User Interface and Everything in Between"; IBM.COM/Redbooks (2014); 693 pgs (Part 1, 231 pgs).
Amra, N. K. et al., "Modernizing IBM i Applications from the Database up to the User Interface and Everything in Between"; IBM.COM/Redbooks (2014); 693 pgs (Part 2, 231 pgs).
Amra, N. K. et al., "Modernizing IBM i Applications from the Database up to the User Interface and Everything in Between"; IBM.COM/Redbooks (2014); 693 pgs (Part 3, 231 pgs).
Distante, D. et al., "Redesigning Legacy Applications for the Web with UWAT+: A Case Study"; ICSE (2006); 10 pgs.

* cited by examiner

APPLICATION DISPOSITION DEFINITION AGENT TO UPDATE APPLICATIONS WITHOUT ACCESS TO SOURCE CODE

BACKGROUND

Technical Field

The present disclosure generally relates to migrating computer applications for cloud computing.

Description of the Related Arts

Enterprises are moving their workload into cloud for better resource utilization and better pay per service usage, though most of the enterprises' workloads are based on legacy technology and sitting on on-premises servers. In order to move the workload to the cloud, documentations of the corresponding application are often needed.

SUMMARY

Some embodiments of the disclosure provide an application disposition definition agent (ADDA) system. The ADDA system intercepts runtime data generated by resources of a first platform when an application is executing in the first platform. The ADDA system discovers components of the application based on the intercepted runtime data. The ADDA system generates an application architecture that includes the discovered components of the application. The generated application architecture can be used to deploy the application in a second platform.

According to one embodiment, a computer program product includes one or more non-transitory computer-readable storage devices and program instructions stored on at least one of the one or more non-transitory storage devices. The program instructions are executable by a processor, the program instructions comprising sets of instructions for intercepting runtime data generated by resources of a first platform when an application is executing in the first platform. Components of the application are discovered based on the intercepted runtime data. An application architecture is provided including the discovered components of the application.

According to another embodiment a computing device includes a processor and a storage device storing a set of instructions. An execution of the set of instructions by the processor configures the computing device to perform acts including intercepting runtime data generated by resources of a first platform when an application is executing in the first platform. Components of the application are discovered based on the intercepted runtime data. An application architecture including the discovered components of the application is generated. The application is deployed in a second platform according to the application architecture.

The preceding Summary is intended to serve as a brief introduction to some embodiments of the disclosure. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a Summary, Detailed Description and the Drawings are provided. Moreover, the claimed subject matter is not to be limited by the illustrative details in the Summary, Detailed Description, and the Drawings, but rather is to be defined by the appended claims, because the claimed subject matter can be embodied in other specific forms without departing from the spirit of the subject matter.

BRIEF DESCRIPTION OF THE DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps.

DETAILED DESCRIPTION

Figure 1:
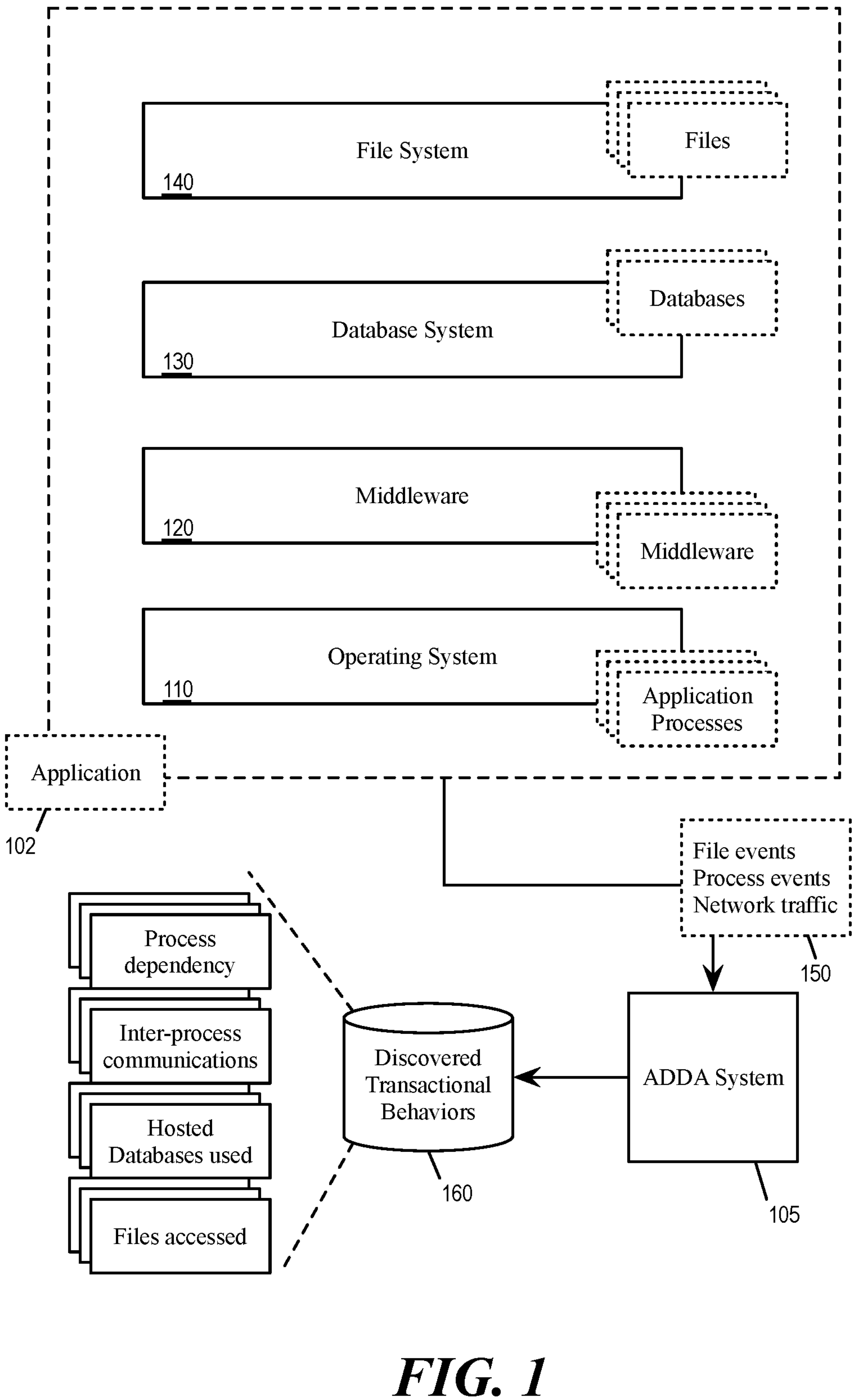
FIG. 1 conceptually illustrates a computing environment in which an application operates.

In the following detailed description, numerous specific details are set forth by way of examples in order to provide a thorough understanding of the relevant teachings. However, it should be apparent that the present teachings may be practiced without such details. In other instances, well-known methods, procedures, components, and/or circuitry have been described at a relatively high-level, without detail, in order to avoid unnecessarily obscuring aspects of the present teachings.

Enterprises often lose the best documentation of their legacy applications, or may not maintain the team that developed the legacy applications. Sometimes enterprises acquire software developed by 3rd party vendors, so the enterprises lack the documentation. Sometimes the enterprise may want to migrate an application to a cloud data center may be reluctant to provide access to mission critical servers, thereby leaving the salient components of the application to be discovered.

An enterprise may want to migrate an application into a cloud environment, but may not be sure how many components the application may comprise or how many components are compatible with being rehosted on cloud. Most cloud migration efforts start with image cloning, in which an image of the operating system running the application is replicated to virtual machines (VMs) in the cloud. In other words, the application being migrated is rehosted in an Infrastructure as a Service (IaaS) manner, and the enterprise typically has to pay for the cost of managing the infrastructure resources. On the other hand, if the service components of the application being migrated are well defined, the service components can be re-architected as cloud optimized services in a Platform as a Service (PaaS) manner. Thus, an effective re-architect of the migrating application may allow the application to be scaled to its full capabilities in the target cloud.

Some embodiments of the disclosure provide an application disposition definition agent (ADDA) system for migrating legacy applications into a cloud computing environment. The ADDA system identifies the architecture of the application with no prior knowledge or minimal knowledge of the architecture. The ADDA system monitors and analyzes traffic (by e.g., packet sniffing) to and from the application and correlates the pattern of traffic to identify the architecture. The ADDA system discovers and re-architects the application for migration by handling application events such as file event, process events, and network traffic analysis of IP packets. The application is decomposed, and business workflows and subcomponents are identified to reverse engineer the existing architecture. The application characteristics such as scalability, transactional behaviors, and layer-based architecture can be identified and made available for further analysis.

In some embodiments, the ADDA system intercepts runtime data generated by infrastructure resources of a first (original) platform when an application is executing in the first platform. the ADDA system identifies components and relationships and/or connections of the application based on the intercepted runtime data. The ADDA system may map the identified components of the application to a second (target) platform or provide information to facilitate such mapping. In some embodiment, each identified component is labeled as one of a database component, a web component, and an application component. The ADDA system may also discover transactional behaviors and determine scalability parameters of each identified component such that the mapping to the second platform is based on the label, the transactional behaviors, and the scalability parameters of the identified components.

FIG. 1 conceptually illustrates a computing environment 100 in which an application 102 operates. The computing environment 100 provides the application context in which a ADDA system 105 explores events related to the application and identifies components and relationships of the application 102. The computing environment 100 may be one single computing device, a virtual machine (VM), or a collection of servers and resources that are interconnected by a network. The computing environment 100 executes several software modules, including an operating system 110, middleware 120, a database system 130, and a file system 140. The ADDA system 105 may operate as a software module executing in the computing environment 100, or in a separate computing device that has visibility into the computing environment 100. In some embodiments, scripts are deployed in each virtual machine (VM) related to the application to identify the apps installed on the VM and the processes running on the VM. In some embodiments, the ADDA system provides analysis of the software (whether monolithic or microservices) that run on single or multiple servers in a client server environment.

The operating system 110 may host processes and subprocesses of the application 102. Each process or subprocess may execute a middleware 120 assigned to it. The middleware 120 may connect to a database 130 (e.g., for a business operation). The middleware 120 and the database 130 are identified and known to the ADDA system 105. The different application processes may communicate with each other via events. Application configurations can be read from the file system 140. Data produced by the application processes are written to the file system 140 or the database system 130, which may store the data to a remote server that is accessible by a network. Local files are candidates for discovery for identifying application components for re-architecting an application by the ADDA system 105.

Figure 2:
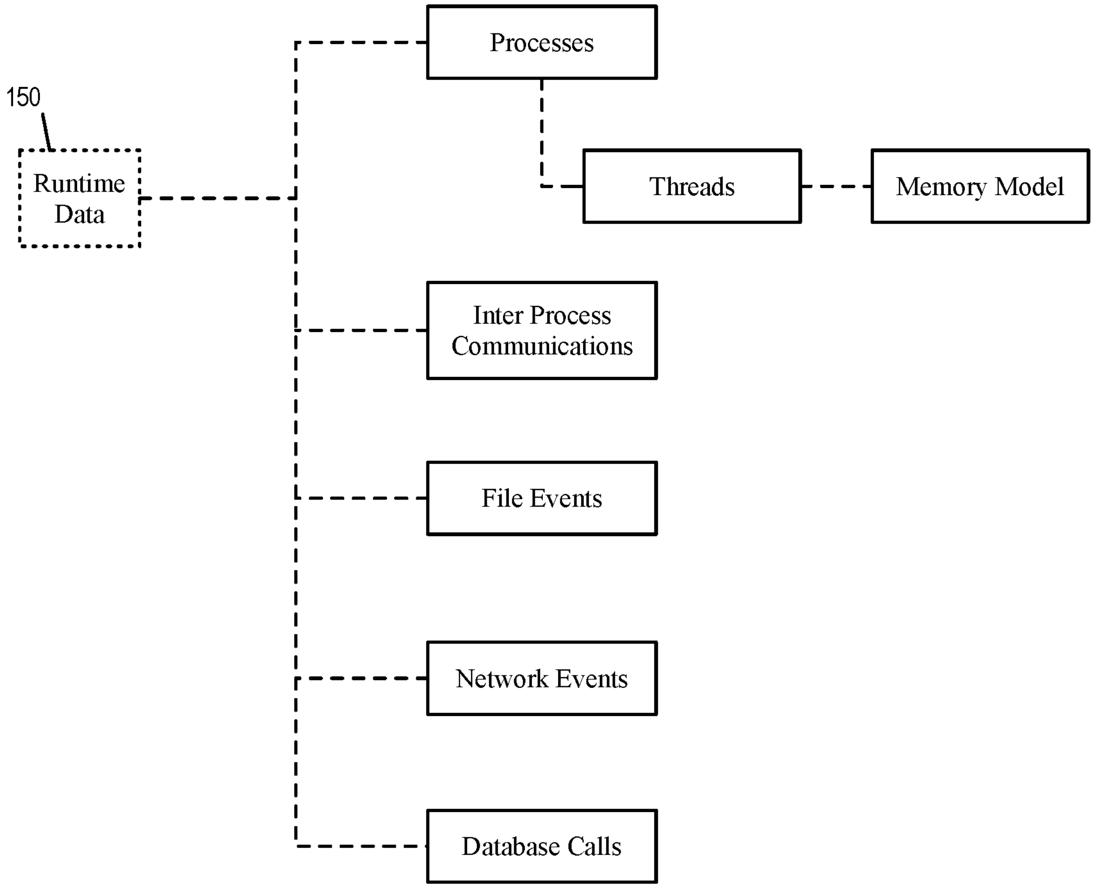
FIG. 2 conceptually illustrates the content of the runtime data intercepted by the ADDA system.

The ADDA system 105 monitors or intercepts runtime data 150 (including a runtime event) of the computing environment 100. Instead of or in conjunction with using the intercepted runtime data, the ADDA system may analyze affinity dataset from previous discoveries of the application performed by third party tools. FIG. 2 conceptually illustrates the content of the runtime data intercepted by the ADDA system. As illustrated, the runtime data 150 may include file event, process events (threads and memory usage), inter-process communications, network traffic events, and database calls. The ADDA may intercept the runtime data by packet sniffing (e.g., Packets, Port and Protocol, CLI-Argument) or network scan.

The ADDA system 105 analyzes events generates by the application 102 and the operating system 110 to identify the application architecture. The ADDA system 105 identifies application specific events based on resource behavior analytics. The ADDA system may work on infrastructure level to track the inter-process communications, TCP calls, UDP calls, and file events to identify the architecture of the application 102.

ADDA system may apply machine learning techniques to the captured runtime traffic pattern to identify communications patterns and resource utilization at process level, and other information that can pulled from the infrastructure, such as information pulled at the level of VMs. Such machine learning may be based on a machine learning model that is constructed by using captured runtime traffic of known applications as training input and corresponding known resource utilization as expected output. The ADDA system may use runtime information, inter process communication, VM communication, file events to identify behavioral changes of infrastructure based on application transactions. ADDA system may apply machine learning techniques to the captured runtime traffic pattern to identify communication patterns resource utilization at process level, and other information that can be pulled at VM level.

The ADDA system 105 discovers components of the application that do not have the source code or documentation (e.g., components being migrated from unknown sources.) In some embodiments, the ADDA system discovers the components using runtime behavioral data obtained from the infrastructure. Such runtime behavioral data may include communications patterns, resource consumption patterns, the application's file/process/network level events. The intercepted runtime behavior data are used by the ADDA system 105 to discover application's transactional behaviors 160, such as the application's process dependency, inter-process communications, database usage, and file usage. For example, the ADDA system 105 may use process events and network traffic events to identify inter-process communications. The ADDA system may identify processes and subprocesses, including spawned processes, pertaining to the application as application components.

Figure 3:
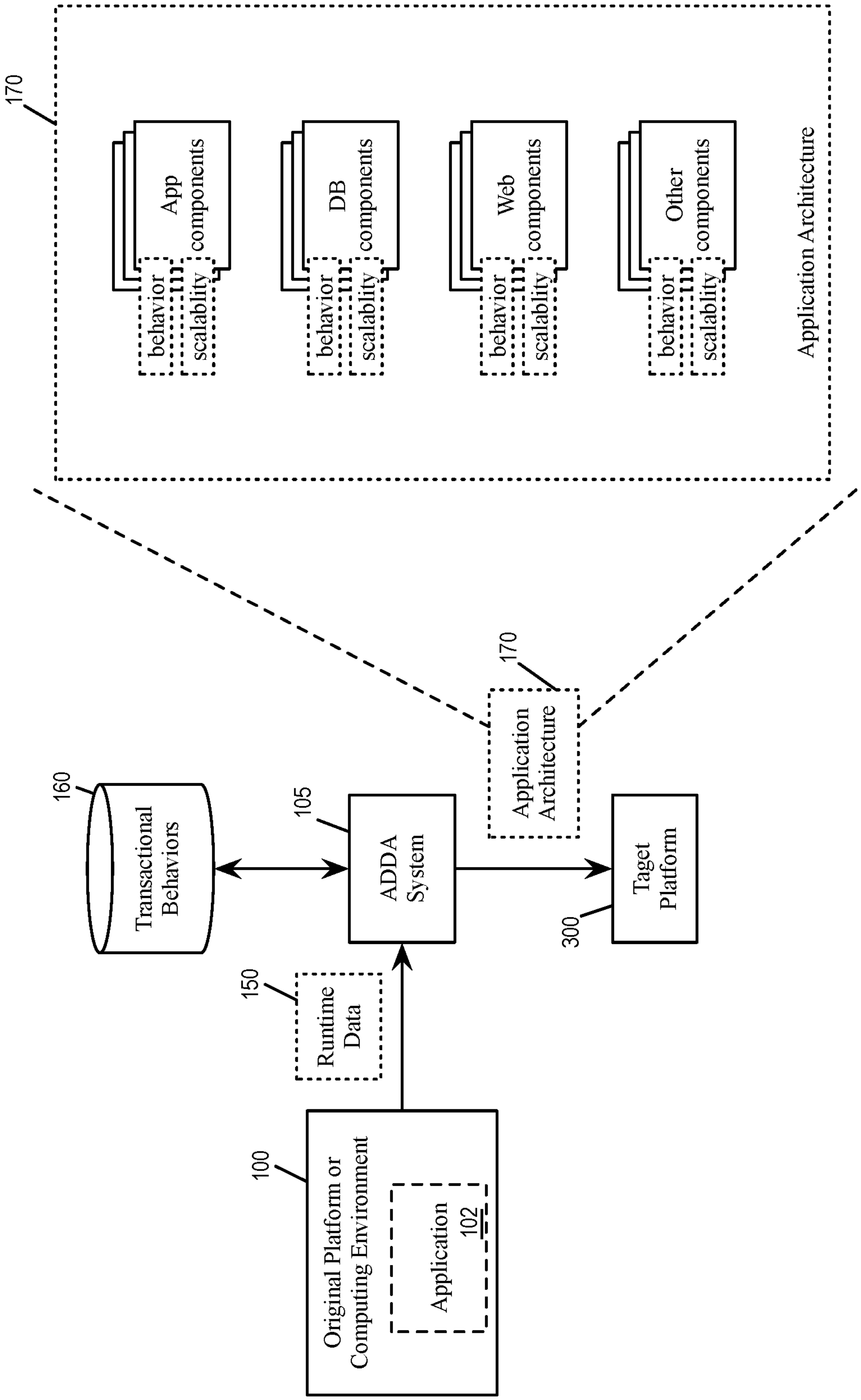
FIG. 3 conceptually illustrates an application disposition definition agent (ADDA) system re-architecting an application based on runtime data from an original platform.

FIG. 3 conceptually illustrates the ADDA system re-architecting an application 102 based on runtime data from an original platform. As illustrated, the ADDA system 105 receives runtime data 150 that is intercepted from the infrastructure of the computing environment 100 (as the original platform). Based on the runtime data 150, the ADDA system 105 discovers the set of transactional behaviors 160 of the application 102.

The ADDA system uses the discovered transactional behaviors 160 to identify or discover components 310 of the application 102. The ADDA system 105 also associates each discovered component with the component's transactional behaviors and certain scalability and/or performance parameters. The discovered components, along with their transactional behavior, scalability/performance parameters, are provided by the ADDA system 105 as application architecture 170 that can be used to implement the application 102 in a target platform 300. The transactional behaviors of the components may include references to resources such as database, middleware, file systems, and operating systems.

The ADDA system 105 also labels some of the discovered components as web, app, or database components based on the discovered transactional behaviors. This is done without having access to source code, configuration files and windows registry of the original application. The ADDA system may also use file events (e.g., storage and retrieval of files) in the intercepted runtime behaviors or discovered transactional behaviors to identify the HTML/Web template components in an application. The ADDA system may also identify components that implement communication channels, channels using protocols such as SOAP, SOCKET, QUEUE, and REST. In some embodiments, the ADDA system identifies components that are atomic deployable units and specifies so in the application architecture 170. In some embodiments, the ADDA system re-architects the application for cloud hosting and may structure the application architecture 170 for PaaS.

Figure 4:
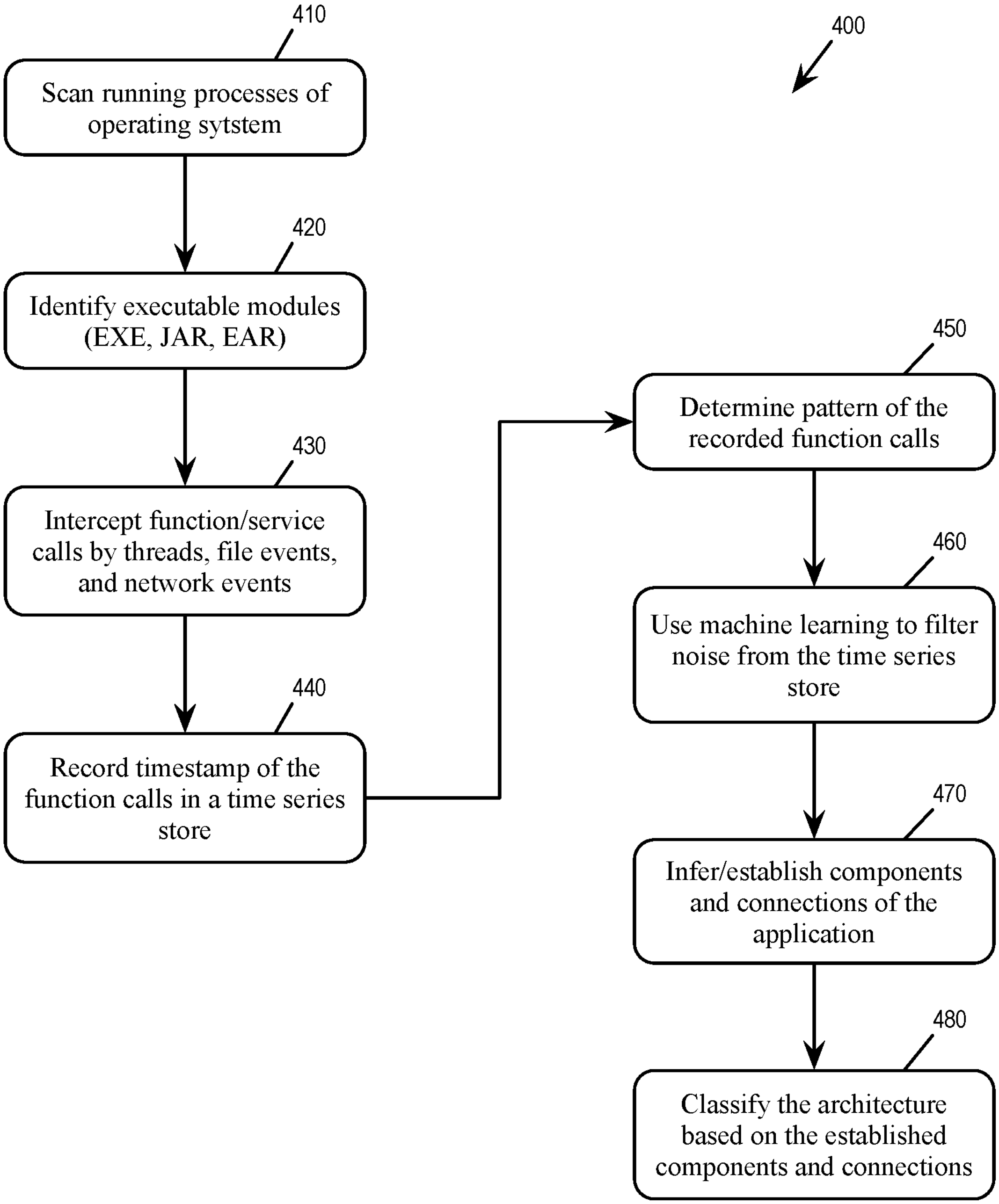
FIG. 4 conceptually illustrates a process for using runtime data to establish an architecture of an application, consistent with an exemplary embodiment.

FIG. 4 conceptually illustrates a process 400 for using runtime data to establish an architecture of an application, consistent with an illustrative embodiment. In some embodiments, one or more processing units (e.g., processor) of a computing device implementing the ADDA system 105 performs the process 400 by executing instructions stored in a computer readable medium.

The ADDA system scans (at block 410) running processes of an operating system and identifies (at block 420) executable modules (e.g., by examining EXE, JAR, EAR files). The system intercepts (at block 430) runtime data such as function or service calls by threads, file events, and network events. The system records (at block 440) the timestamps of runtime data (e.g., function calls) in a time series store.

The system determines (at block 450) pattern of the function calls recorded in the time series store. The system uses (at block 460) machine learning to filter noise from the content of the time series store. Such machine learning may be based on a model that is constructed by using records of function calls of known applications as training input and corresponding architecture classification as expected output. The system establishes (at block 470) or infers components and connections of the application from the content of the time series store. The system classifies (at block 480) the architecture based on the established components and connections. For example, the system may classify the application as a 2-tier application, or an N-tier application. The system may also identify one or more application program interfaces (APIs) used by the application.

In some embodiments, the ADDA system examines application resource consumption and runtime behavioral changes to identify loosely and tightly coupled components in order to convert the components to different stand-alone services. The ADDA system examines each application at the infrastructure level, marking the application's different components and communication patterns. The resource consumption patterns of the different components are also used to determine the scalability and refactoring of the application.

The ADDA system may associate each identified component with a set of performance parameters and/or scalability parameters in the application architecture 170. The target platform 300 implementing the application may use the application architecture 170 to allocate the appropriate resources to the identified application components. For example, the ADDA system may check the reliability of TCP, HTTP, RMI, .NET REMOTE, named pipe, FTP, and include the reliability measures in the discovered transactional behaviors 160 as indication of performance requirement. The ADDA system may also, based on the intercepted runtime data 150, determine various resource usage (memory footprint, CPU cycles, network traffic) data. The resource usage data can be used to derive scaling parameters or performance parameters for various discovered components.

A performance parameter of an application component may be used by the target platform (or its administrator) to find an available resource having a performance measure that matches the expected performance of the application component. A scalability parameter of the application component may be used by the target platform to scale or refactor the allocation of certain resources (e.g., due to higher expected usage or certain resources being more abundant in the target platform.)

The ADDA system may also discover the dependency of remote and undocumented files that are either part of the application configuration or determined to be necessary for running the application. The ADDA system 105 may use these discovered relationships to structure the application architecture 170. For example, the ADDA system may discover the relationships between the application and API endpoints and include the discovered API relationship as a transactional behavior of one of the application components in the application architecture 170. The ADDA system may also discover middleware that is used by the application.

In some embodiments, The ADDA system 105 may discover one or more databases used by the application 102. For each database discovered by the ADDA system, the ADDA system may identify a compatible database technology by applying machine learning to runtime network traffic data. The identified compatible database technology may then be included as part of the application architecture 170. Such machine learning may be based on a machine learning model that is constructed by using historical runtime network traffic data of known applications as training input and identities of databases used by those applications as expected output.

Figure 5:
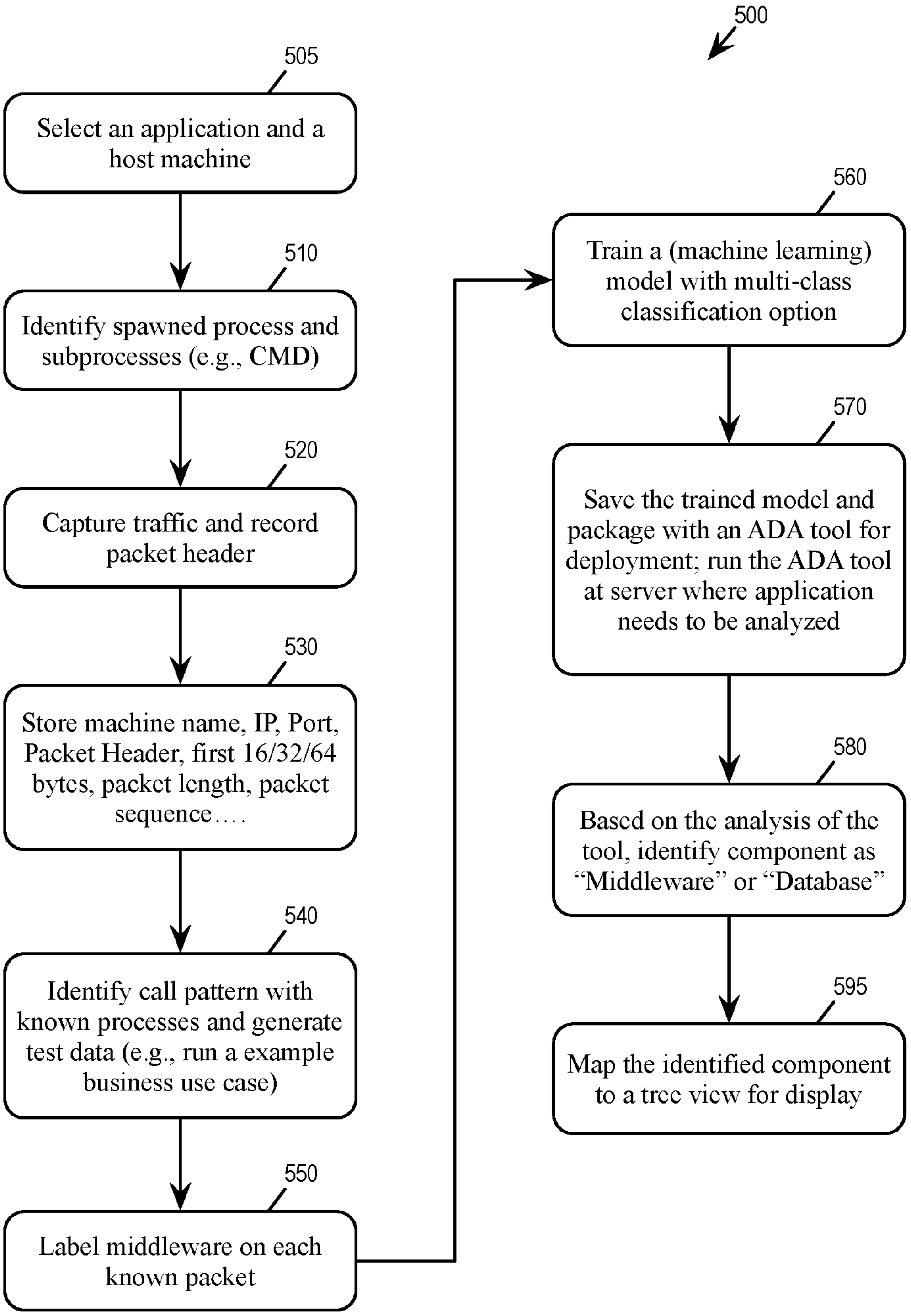
FIG. 5 conceptually illustrates a process for using runtime data to establish an architecture of an application that uses remote resources such as database or middleware, consistent with an exemplary embodiment.

FIG. 5 conceptually illustrates a process 500 for using runtime data to establish an architecture of an application that uses remote resources such as database or middleware, consistent with an exemplary embodiment. In some embodiments, one or more processing units (e.g., processor) of a computing device implementing the ADDA system 105 perform the process 500 by executing instructions stored in a computer readable medium.

The ADDA system selects (at block 505) an application and a host machine. The system identifies (at block 510) spawned processes and sub-processes of the application running on the host machine. The system captures (at block

520) network traffic and records packet header information at the host machine. The system stores (at block 530) packet information, e.g., machine name, IP address, Port, packet header, first 16 or 32 or 64 bytes, packet length, packet sequence. In some embodiments, the information is stored in a time series store.

The system identifies (at block 540) call patterns with known processes and generates test data by e.g., running an example business use case. The system labels (at block 550) middleware on each known packet. The system trains (at block 560) a machine learning model with multi-class classification option. The system saves (at block 570) the trained model and packets (header and information) with a visualization tool for deployment. The system then runs the visualization tool at a server to analyze the application. The system identifies (at block 580) a component as "middleware" or "database" based on the analysis of the tool. The system maps (at block 590) the identified component for display.

Figure 6:
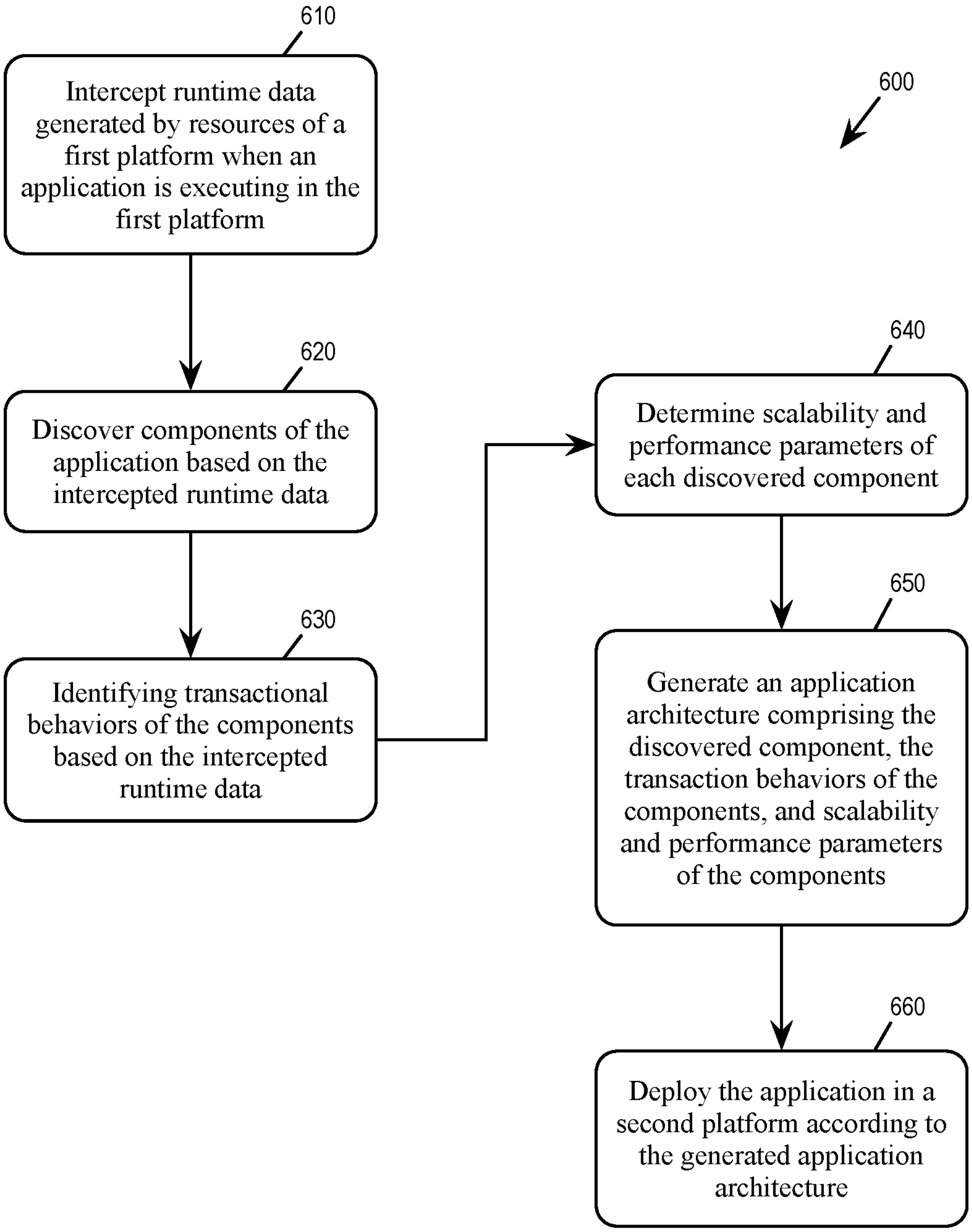
FIG. 6 conceptually illustrates a process for using runtime data to re-architect an application for installation in another platform, consistent with an exemplary embodiment.

FIG. 6 conceptually illustrates a process 600 for using runtime data to re-architect an application for installation in another platform, consistent with an exemplary embodiment. In some embodiments, one or more processing units (e.g., processor) of a computing device implementing the ADDA system 105 performs the process 500 by executing instructions stored in a computer readable medium.

The ADDA system intercepts (at block 610) runtime data generated by resources of a first platform when an application is executing in the first platform. The intercepted runtime data may include records of network traffic, process events, file events, and/or records of other application events occurring in the first platform. The intercepted runtime data may include communications between processes executing in resources of the first platform. In some embodiments, the ADDA system may also use an affinity dataset from previous discoveries of the application performed by third party tools instead of, or in conjunction with, the runtime data.

The ADDA system discovers (at block 620) components of the application based on the intercepted runtime data. The system may discover known and unknown components by discovering process dependency, inter-process communications, databases used, files accessed, and/or other transactional behaviors based on the intercepted runtime data. In some embodiments, the system discovers the components by identifying processes (sub-processes and spawned processes) of the application. The ADDA system may also label each discovered component as one of a database component, a web component, and an application component. The system may also discover components that are web presentation templates (e.g., HTML, templates) based on file events in the runtime data. The system may also discover components that are communications channels used by the application (e.g., SOAP, SOCKET, QUEUE, REST).

The ADDA system identifies (at block 630) transactional behaviors of the components based on the intercepted runtime data. For example, the system may discover one or more databases used by the application. The system may apply machine learning on the intercepted runtime data to match a discovered database with a known database technology. The system may discover a component's relationship with an endpoint of an application program interface (API). The system may discover the component's dependency upon remote files. Such remote files may be undocumented files, part of application's configuration, or other files necessary for running the application.

The ADDA system determines (at block 640) scalability and performance parameters of each discovered component based on the intercepted runtime data. The system may also determine a reliability measure of one or more communications protocols based on the intercepted runtime data.

The ADDA system generates (at block 650) an application architecture comprising the discovered components of the application, the transactional behaviors of the components, and the scalability and performance parameters of the components. The labels of the discovered components may also be included in the application architecture. The application architecture may include one or more atomic deployable units of the application.

Figure 7:
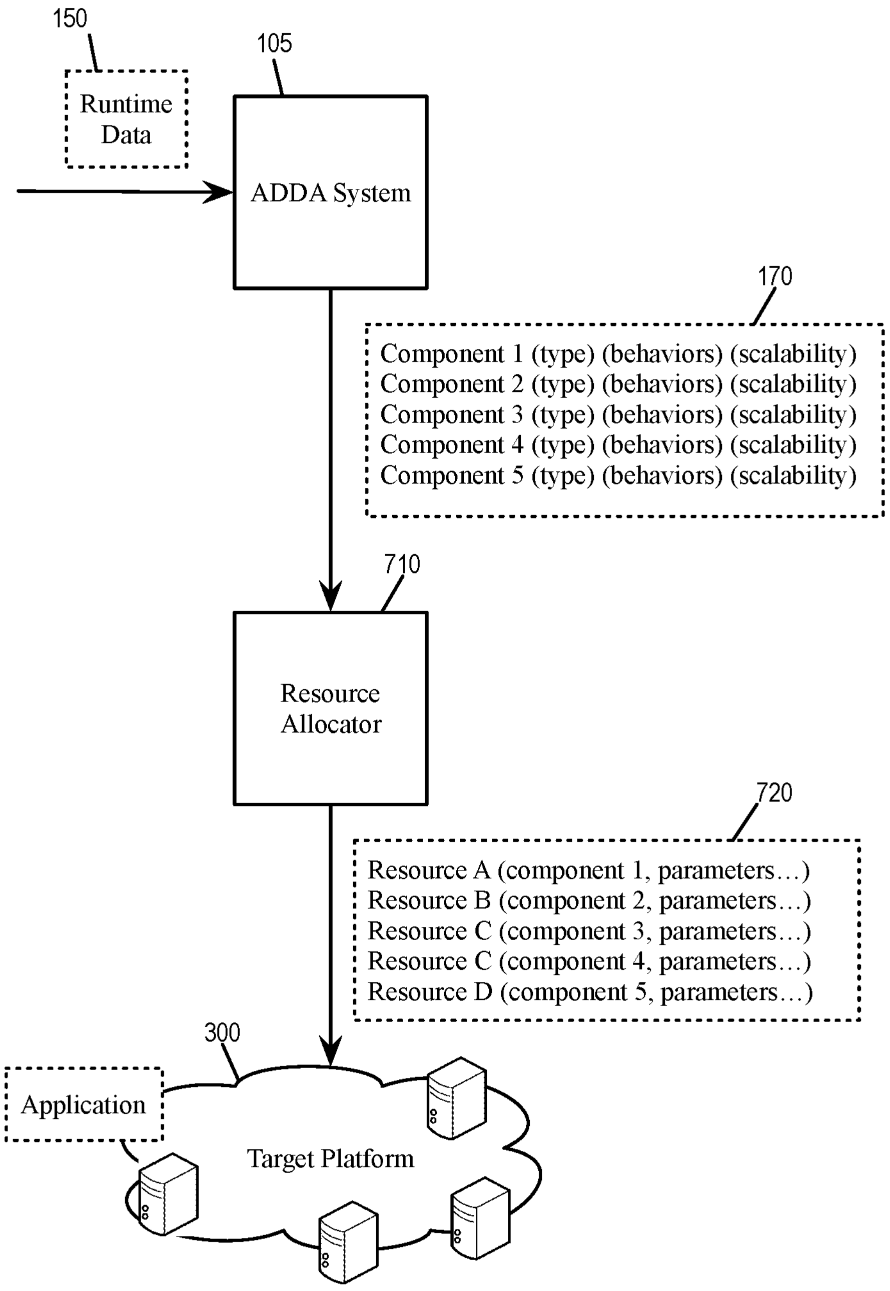
FIG. 7 conceptually illustrates using the generated application architecture to install an application in another platform.

The ADDA system deploys (at block 660) the application in a second platform according to the generated application architecture. The second platform may be in a cloud environment using in a Platform as Service (PaaS) format. FIG. 7 conceptually illustrates using the generated application architecture to install an application in another platform. In the figure, the ADDA system 105 processes the runtime data 105 to generate the application architecture 170, which includes details of the application components and their transactional behavior and scalability parameters. The application architecture 170 is provided to a resource allocator 710, which maps the components (components 1-5) identified in the application architecture 170 to the resources (resources A-D) of the target platform 300. The resource allocator 710 generates a resource configuration data 720, which configures the resources of the target platform 300 to perform the functions of the mapped components.

By intercepting runtime data generated by the execution of a target application, the ADDA system discovers components of the application, even when the application is a legacy application that is treated as a black box with unknown components. The runtime data being intercepted includes massive records of network traffic, process events, and file events, and the ADDA system deploys machine learning on the massive amount of data to identify the components of the application. The ADDA further structures the discovered components as an application architecture, along with their discovered transactional behaviors and scalability parameters, for optimally migrating the target application to the cloud environment.

The ADDA system is implemented within a computer infrastructure by having one or more computing devices monitoring and intercepting runtime data from resources of a computing environment. The computer infrastructure is further used to analyze the runtime data to discover the known and unknown components of a target application and to generate an application architecture specifying transactional behaviors and scalability parameters of the various components. A same or different computing device may process application architecture to implement the target application in a different computing platform, e.g., cloud.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 8:
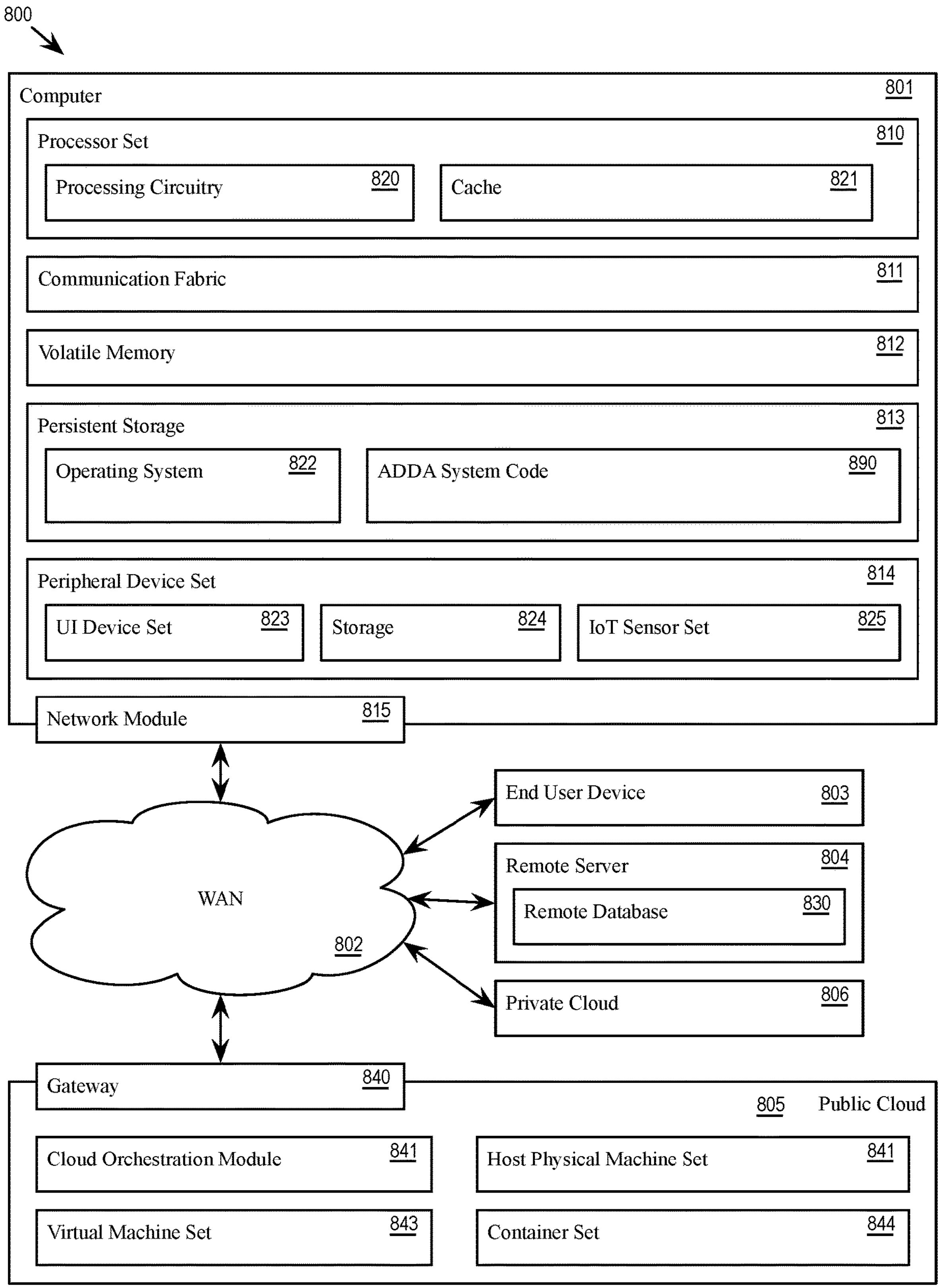
FIG. 8 conceptually illustrates an example computing environment, consistent with some embodiments of the disclosure.

FIG. 8 conceptually illustrates an example computing environment 800, consistent with some embodiments of the disclosure. The computing environment 800 includes an example of an environment for the execution of at least some of the computer code involved in performing the inventive methods, such as an ADDA system code block 890 performing the functions of the ADDA system 105. In addition to the block 890, computing environment 800 includes, for example, computer 801, wide area network (WAN) 802, end user device (EUD) 803, remote server 804, public cloud 805, and private cloud 806. In this embodiment, computer 801 includes processor set 810 (including processing circuitry 820 and cache 821), communication fabric 811, volatile memory 812, persistent storage 813 (including operating system 822 and block 890, as identified above), peripheral device set 814 (including user interface (UI) device set 823, storage 824, and Internet of Things (IoT) sensor set 825), and network module 815. Remote server 804 includes remote database 830. Public cloud 805 includes gateway 840, cloud orchestration module 841, host physical machine set 842, virtual machine set 843, and container set 844.

COMPUTER 801 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 830. As is well understood in the art of computer technology, and depending upon the technology, performance of a computer-implemented method may be distributed among multiple computers and/or between multiple locations. On the other hand, in this presentation of computing environment 800, detailed discussion is focused on a single computer, specifically computer 801, to keep the presentation as simple as possible. Computer 801 may be located in a cloud, even though it is not shown in a cloud in FIG. 8. On the other hand, computer 801 is not required to be in a cloud except to any extent as may be affirmatively indicated.

PROCESSOR SET 810 includes one, or more, computer processors of any type now known or to be developed in the future. Processing circuitry 820 may be distributed over multiple packages, for example, multiple, coordinated integrated circuit chips. Processing circuitry 820 may implement multiple processor threads and/or multiple processor cores. Cache 821 is memory that is located in the processor chip package(s) and is typically used for data or code that should be available for rapid access by the threads or cores running on processor set 810. Cache memories are typically organized into multiple levels depending upon relative proximity to the processing circuitry. Alternatively, some, or all, of the cache for the processor set may be located "off chip." In some computing environments, processor set 810 may be designed for working with qubits and performing quantum computing.

Computer readable program instructions are typically loaded onto computer 801 to cause a series of operational steps to be performed by processor set 810 of computer 801 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 821 and the other storage media discussed below. The program instructions, and associated data, are accessed by processor set 810 to control and direct performance of the inventive methods. In computing environment 800, at least some of the instructions for performing the inventive methods may be stored in block 890 in persistent storage 813.

COMMUNICATION FABRIC 811 is the signal conduction path that allows the various components of computer 801 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 812 is any type of volatile memory now known or to be developed in the future. Examples include dynamic type random access memory (RAM) or static type RAM. Typically, volatile memory 812 is characterized by random access, but this is not required unless affirmatively indicated. In computer 801, the volatile memory 812 is located in a single package and is internal to computer 801, but, alternatively or additionally, the volatile memory may be distributed over multiple packages and/or located externally with respect to computer 801.

PERSISTENT STORAGE 813 is any form of non-volatile storage for computers that is now known or to be developed in the future. The non-volatility of this storage means that the stored data is maintained regardless of whether power is being supplied to computer 801 and/or directly to persistent storage 813. Persistent storage 813 may be a read only memory (ROM), but typically at least a portion of the persistent storage allows writing of data, deletion of data and re-writing of data. Some familiar forms of persistent storage include magnetic disks and solid state storage devices. Operating system 822 may take several forms, such as various known proprietary operating systems or open source Portable Operating System Interface-type operating systems that employ a kernel. The code included in block 890 typically includes at least some of the computer code involved in performing the inventive methods.

PERIPHERAL DEVICE SET 814 includes the set of peripheral devices of computer 801. Data communication connections between the peripheral devices and the other components of computer 801 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 823 may include components such as a display screen, speaker, microphone, wearable devices (such as goggles and smart watches), keyboard, mouse, printer, touchpad, game controllers, and haptic devices. Storage 824 is external storage, such as an external hard drive, or insertable storage, such as an SD card. Storage 824 may be persistent and/or volatile. In some embodiments, storage 824 may take the form of a quantum computing storage device for storing data in the form of qubits. In embodiments where computer 801 is required to have a large amount of storage (for example, where computer 801 locally stores and manages a large database) then this storage may be provided by peripheral storage devices designed for storing very large amounts of data, such as a storage area network (SAN) that is shared by multiple, geographically distributed computers. IoT sensor set 825 is made up of sensors that can be used in Internet of Things applications. For example, one sensor may be a thermometer and another sensor may be a motion detector.

NETWORK MODULE 815 is the collection of computer software, hardware, and firmware that allows computer 801 to communicate with other computers through WAN 802. Network module 815 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 815 are performed on the same physical hardware device. In other embodiments (for example, embodiments that utilize software-defined networking (SDN)), the control functions and the forwarding functions of network module 815 are performed on physically separate devices, such that the control functions manage several different network hardware devices. Computer readable program instructions for performing the inventive methods can typically be downloaded to computer 801 from an external computer or external storage device through a network adapter card or network interface included in network module 815.

WAN 802 is any wide area network (for example, the internet) capable of communicating computer data over non-local distances by any technology for communicating computer data, now known or to be developed in the future. In some embodiments, the WAN 802 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 803 is any computer system that is used and controlled by an end user (for example, a customer of an enterprise that operates computer 801), and may take any of the forms discussed above in connection with computer 801. EUD 803 typically receives helpful and useful data from the operations of computer 801. For example, in a hypothetical case where computer 801 is designed to provide a recommendation to an end user, this recommendation would typically be communicated from network module 815 of computer 801 through WAN 802 to EUD 803. In this way, EUD 803 can display, or otherwise present, the recommendation to an end user. In some embodiments, EUD 803 may be a client device, such as thin client, heavy client, mainframe computer, desktop computer and so on.

REMOTE SERVER 804 is any computer system that serves at least some data and/or functionality to computer 801. Remote server 804 may be controlled and used by the same entity that operates computer 801. Remote server 804 represents the machine(s) that collect and store helpful and useful data for use by other computers, such as computer 801. For example, in a hypothetical case where computer 801 is designed and programmed to provide a recommendation based on historical data, then this historical data may be provided to computer 801 from remote database 830 of remote server 804.

PUBLIC CLOUD 805 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 805 is performed by the computer hardware and/or software of cloud orchestration module 841. The computing resources provided by public cloud 805 are typically implemented by virtual computing environments that run on various computers making up the computers of host physical machine set 842, which is the universe of physical computers in and/or available to public cloud 805. The virtual computing environments (VCEs) typically take the form of virtual machines from virtual machine set 843 and/or containers from container set 844. It is understood that these VCEs may be stored as images and may be transferred among and between the various physical machine hosts, either as images or after instantiation of the VCE. Cloud orchestration module 841 manages the transfer and storage of images, deploys new instantiations of VCEs and manages active instantiations of VCE deployments. Gateway 840 is the collection of computer software, hardware, and firmware that allows public cloud 805 to communicate through WAN 802.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 806 is similar to public cloud 805, except that the computing resources are only available for use by a single enterprise. While private cloud 806 is depicted as being in communication with WAN 802, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 805 and private cloud 806 are both part of a larger hybrid cloud.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:

intercepting runtime data generated by resources of a first platform when an application is executing in the first platform;

discovering components of the application based on the intercepted runtime data, wherein the discovering of the components comprises discovering transactional behaviors of the application;

labeling, based on the discovered transaction behaviors of the application, each discovered component of the discovered components as one of a database component, a web component, or an application component;

generating an application architecture comprising the discovered components and the label of each discovered component of the discovered components of the application; and deploying the application in a second platform according to the application architecture.

2. The computer-implemented method of claim 1, wherein the intercepted runtime data comprises records of application events occurring in the first platform.

3. The computer-implemented method of claim 1, wherein the intercepted runtime data comprises communications between processes executing in the resources of the first platform.

4. The computer-implemented method of claim 1, wherein the discovering of the components further comprises identifying processes of the application.

5. The computer-implemented method of claim 1, wherein the application architecture comprises one or more atomic deployable units of the application.

6. The computer-implemented method of claim 1, further comprising:

identifying transactional behaviors of the components based on the intercepted runtime data; and providing the transactional behaviors of the components with the application architecture.

7. The computer-implemented method of claim 6, further comprising:

determining scalability and performance parameters of each discovered component of the discovered components based on the intercepted runtime data; and providing the scalability and performance parameters of the discovered components with the application architecture.

8. The computer-implemented method of claim 6, wherein the identifying of a transactional behavior of a component of the components comprises discovering one or more databases used by the application, and wherein the transactional behaviors include the transactional behavior.

9. The computer-implemented method of claim 8, further comprising applying machine learning on the intercepted runtime data to match a discovered database of the discovered one or more databases with a known database technology.

10. The computer-implemented method of claim 6, wherein the identifying of a transactional behavior of a component of the components comprises discovering a relationship with an endpoint of an application program interface (API), and wherein the transactional behaviors include the transactional behavior.

11. The computer-implemented method of claim 6, wherein the identifying of a transactional behavior of a component of the components comprises discovering dependency of the component upon remote files, and wherein the transactional behaviors include the transactional behavior.

12. The computer-implemented method of claim 6, wherein the identifying of a transactional behavior of a component of the components comprises determining a reliability measure of one or more communications protocols based on the intercepted runtime data, and wherein the transactional behaviors include the transactional behavior.

13. The computer-implemented method of claim 1, wherein the discovered components comprise web presentation template components that are identified based on file events in the intercepted runtime data.

14. The computer-implemented method of claim 1, wherein the discovered components comprise communications channels used by the application.

15. A computer program product, comprising:

one or more non-transitory computer-readable storage devices and program instructions stored on at least one of the one or more non-transitory computer-readable storage devices, the program instructions executable by a processor, the program instructions comprising sets of instructions for:

intercepting runtime data generated by resources of a first platform when an application is executing in the first platform;

discovering components of the application based on the intercepted runtime data, wherein the discovering of the components comprises discovering transactional behaviors of the application;

labelling, based on the discovered transaction behaviors of the application, each discovered component of the discovered components as one of a database component, a web component, or an application component; and providing an application architecture comprising the discovered components and the labels of the discovered components of the application.

16. The computer program product of claim 15, wherein the application architecture is operative to install the application in a second platform different from the first platform.

17. A computing device, comprising:

a processor; and a storage device storing a set of instructions, wherein an execution of the set of instructions by the processor configures the computing device to perform acts comprising:

intercepting runtime data generated by resources of a first platform when an application is executing in the first platform;

discovering components of the application based on the intercepted runtime data, wherein the discovering of the components comprises discovering transactional behaviors of the application;

labeling, based on the discovered transaction behaviors of the application, each discovered component of the discovered components as one of a database component, a web component, or an application component;

generating an application architecture comprising the discovered components and the labels of the discovered components of the application; and deploying the application in a second platform according to the application architecture.

18. The computing device of claim 17, wherein the intercepted runtime data comprises records of application events occurring in the first platform.

* * * * *